United States Patent
Kutsuki et al.

(10) Patent No.: US 11,031,895 B2
(45) Date of Patent: Jun. 8, 2021

(54) MOTOR DRIVE SYSTEM AND AIR CONDITIONER

(71) Applicant: Mitsubishi Electric Corporation, Tokyo (JP)

(72) Inventors: Tomohiro Kutsuki, Tokyo (JP); Keiichiro Shizu, Tokyo (JP); Kazunori Hatakeyama, Tokyo (JP); Takashi Yamakawa, Tokyo (JP); Takayuki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/604,857

(22) PCT Filed: Jul. 7, 2017

(86) PCT No.: PCT/JP2017/024998
§ 371 (c)(1),
(2) Date: Oct. 11, 2019

(87) PCT Pub. No.: WO2019/008756
PCT Pub. Date: Jan. 10, 2019

(65) Prior Publication Data
US 2020/0169207 A1    May 28, 2020

(51) Int. Cl.
*H02P 25/18* (2006.01)
*F25B 49/02* (2006.01)
(Continued)

(52) U.S. Cl.
CPC ............ *H02P 25/18* (2013.01); *F25B 49/025* (2013.01); *H02M 7/53871* (2013.01); *H02P 27/08* (2013.01); *H02P 29/00* (2013.01)

(58) Field of Classification Search
CPC .......... H02P 25/18; H02P 27/08; H02P 29/00; H02P 27/06
(Continued)

(56) References Cited

U.S. PATENT DOCUMENTS 5,838,135 A * 11/1998 Satake .................... H02K 16/00
                                                               318/771
8,248,010 B2 * 8/2012 Mukai .................. B62D 5/0487
                                                               318/400.21
(Continued)

FOREIGN PATENT DOCUMENTS

JP    2001-218499 A    8/2001
JP    2008-148490 A    6/2008
(Continued)

OTHER PUBLICATIONS

International Search Report of the International Searching Authority dated Sep. 12, 2017 in corresponding international application No. PCT/JP2017/024998 (and English translation).
(Continued)

*Primary Examiner* — David Luo
(74) *Attorney, Agent, or Firm* — Posz Law Group, PLC

(57) ABSTRACT

A motor drive system can detect a misconnection. A motor drive system for driving a motor including a plurality of stator windings includes: an inverter that converts a DC voltage supplied from a DC voltage source into an AC voltage and applies the AC voltage to the motor; a connection switching device that is disposed between the inverter and the motor and can switch a connection state of the stator windings; and a controller that performs abnormality determination on a connection state of the connection switching device on the basis of a current value of a current flowing in each of the stator windings.

11 Claims, 13 Drawing Sheets

(51) Int. Cl.
*H02M 7/5387* (2007.01)
*H02P 27/08* (2006.01)
*H02P 29/00* (2016.01)

(58) Field of Classification Search
USPC .............................. 318/400.26, 400.01, 700
See application file for complete search history.

(56) References Cited

U.S. PATENT DOCUMENTS

| | | | | |
|---|---|---|---|---|
| 8,363,440 B2* | 1/2013 | Tagome | ................. | H02M 1/28 363/131 |
| 8,659,253 B2* | 2/2014 | Satou | ................. | B62D 5/0484 318/453 |
| 8,878,474 B2* | 11/2014 | Kezobo | ................. | B62D 5/0487 318/400.21 |
| 2015/0028780 A1 | 1/2015 | Hatakeyama et al. | | |
| 2017/0085205 A1 | 3/2017 | Koseki et al. | | |

FOREIGN PATENT DOCUMENTS

| | | | |
|---|---|---|---|
| JP | 2008-228513 | A | 9/2008 |
| JP | 2009-216324 | A | 9/2009 |
| JP | 2009236594 | A | 10/2009 |
| JP | 2011-083396 | A | 4/2011 |
| JP | 2011072068 | A | 7/2011 |
| JP | 2012-055119 | A | 3/2012 |
| JP | 2015-173554 | A | 10/2015 |
| JP | 2016-116309 | A | 6/2016 |

OTHER PUBLICATIONS

Office Action dated May 7, 2020 in the corresponding JP patent application No. 2019-528314 (with English translation).
Extended European Search Report dated May 19, 2020 in the corresponding EP patent application No. 17917170.7.
Office Action dated Jan. 26, 2021 issued in corresponding EP patent application No. 17917170.7.

* cited by examiner

MOTOR DRIVE SYSTEM AND AIR CONDITIONER

CROSS REFERENCE TO RELATED APPLICATION

This application is a U.S. national stage application of International Patent Application No. PCT/JP2017/024998 filed on Jul. 7, 2017, the disclosure of which is incorporated herein by reference.

TECHNICAL FIELD

The present invention relates to a motor drive system including a connection switching device that can switch a connection state of stator windings, and an air conditioner including the motor drive system.

BACKGROUND

Conventionally, there has been known a configuration in which a brushless direct current (DC) motor is used as a motor driven by a motor drive system, and an inverter is used as a motor drive unit. Unlike a commutator motor having a commutator that can become worn, the brushless DC motor does not have a commutator that can become worn, so that the life of a product can be extended. The brushless DC motor can also minimize power consumption as compared to an induction motor configured to apply an electric current to a stator thereof. Therefore, the brushless DC motors are applied to various products including an air conditioner and a washing machine.

Besides, there has been known a motor drive system including a connection switching device that can switch a connection state of stator windings of a brushless DC motor. When the connection state is changed by the connection switching device, an induced voltage constant of the motor changes. When the motor rotates, a voltage higher than or equal to "induced voltage constant×rotational speed" is applied to the motor. In a case where some constraint is imposed on a voltage that can be outputted from an inverter, the connection state with a lower induced voltage constant enables operation at a higher rotational speed. On the other hand, when the motor is driven at a low rotational speed, the connection state with a higher induced voltage constant results in a higher output voltage so that the current is lower and a power consumption proportional to a product of the square of the current and the voltage is saved. Note that the low rotational speed means a rotational speed less than or equal to a threshold such as a rotational speed at which "the maximum value of the induced voltage constant in any of switchable connection states×rotational speed" is less than the maximum voltage value that can be outputted from the inverter.

Patent Literature 1 discloses a motor drive apparatus that can switch a connection state by a connection switching device.

PATENT LITERATURE

Patent Literature 1: Japanese Patent Application Laid-open No. 2008-228513

However, the aforementioned prior art cannot detect a misconnection state. Therefore, there has been a problem that the motor is possibly driven in a misconnection state.

SUMMARY

The present invention has been made in view of the above circumstances, and its object is to provide a motor drive system that can detect a misconnection state.

In order to solve the above-mentioned problem and achieve the object, the present invention provides a motor drive system for driving a motor including a plurality of stator windings, comprising: an inverter to convert a DC voltage supplied from a DC voltage source into an AC voltage and apply the AC voltage to the motor; a connection switching device disposed between the inverter and the motor and capable of switching a connection state of the stator windings; and a controller to perform abnormality determination on a connection state of the connection switching device on the basis of a current value of a current flowing in each of the stator windings.

The motor drive system according to the present invention has an advantageous effect of being able to detect a misconnection state.

DETAILED DESCRIPTION

A motor drive system and an air conditioner according to embodiments of the present invention will now be described in detail with reference to the drawings. Note that the present invention is not necessarily limited to the descriptions of the following embodiments.

First Embodiment

Figure 1:
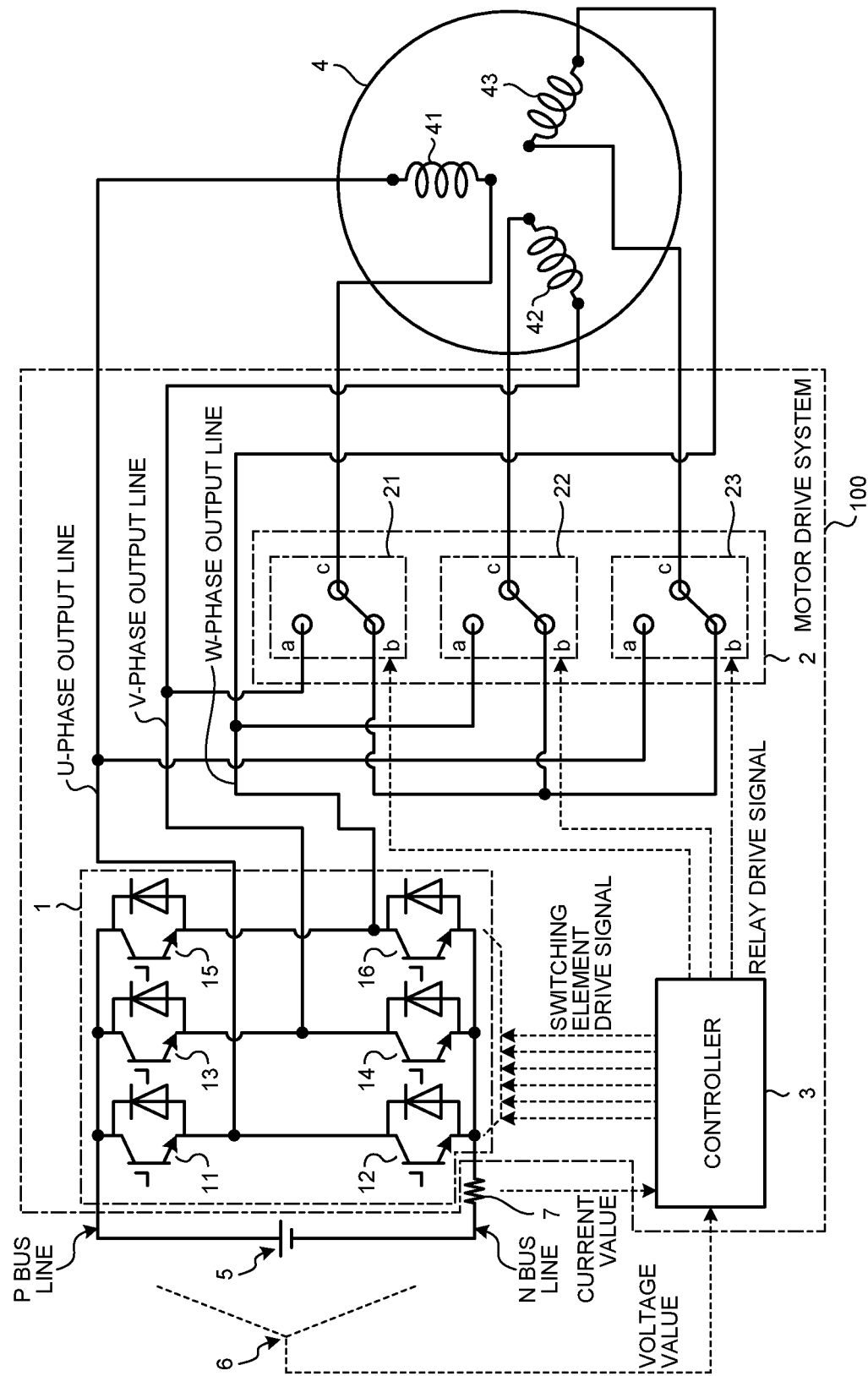
FIG. 1 is a diagram illustrating a configuration of a motor drive system according to a first embodiment.

FIG. 1 is a diagram illustrating a configuration of a motor drive system 100 according to a first embodiment of the present invention. The motor drive system 100 illustrated in FIG. 1 includes an inverter 1, a connection switching device 2, and a controller 3, which is configured to drive a motor 4 that is a three-phase motor.

The inverter 1 illustrated in FIG. 1 is a three-phase voltage type inverter connected to a DC voltage source 5. The inverter 1 includes a switching element 11, a switching element 12, a switching element 13, a switching element 14, a switching element 15, and a switching element 16. The switching element 11, the switching element 13, and the switching element 15 are connected to a P bus line that is a positive bus line, and the switching element 12, the switching element 14, and the switching element 16 are connected to an N bus line that is a negative bus line. The switching element 11 and the switching element 12 are connected to each other in series to form a U-phase leg, the switching element 13 and the switching element 14 are connected to each other in series to form a V-phase leg, and the switching element 15 and the switching element 16 are connected to each other in series to form a W-phase leg. The U-phase leg, the V-phase leg, and the W-phase leg are connected in parallel to each other. The inverter 1 converts a DC voltage from the DC voltage source 5 into an AC voltage and outputs the AC voltage by controlling on/off of the switching element 11, the switching element 12, the switching element 13, the switching element 14, the switching element 15, and the switching element 16.

A U-phase output line is connected to a point between the switching element 11 and the switching element 12 that correspond to the U-phase leg. A V-phase output line is connected to a point between the switching element 13 and the switching element 14 that correspond to the V-phase leg. A W-phase output line is connected to point between the switching element 15 and the switching element 16 that correspond to the W-phase leg.

Note that the DC voltage source 5 need only be able to output a DC voltage, and may have a configuration in which a converter is connected to an AC voltage source.

The connection switching device 2 illustrated in FIG. 1 is disposed between the inverter 1 and the motor 4. The connection switching device 2 includes a relay 21, a relay 22, and a relay 23 each of which corresponds to a contact switch mechanical relay. The connection switching device 2 is caused to switch to Y connection or Δ connection by contacts of the relay 21, the relay 22, and the relay 23. An induced voltage constant of the Y connection is higher than an induced voltage constant of the Δ connection.

The relay 21 includes an a-contact, a b-contact, and a c-contact. The a-contact of the relay 21 is connected to the V-phase output line. The b-contact of the relay 21 is connected to a b-contact of the relay 22 and a b-contact of the relay 23. The c-contact of the relay 21 is connected to one end of a U-phase stator winding 41. Note that another end of the U-phase stator winding 41 is connected to the U-phase output line.

The relay 22 includes an a-contact, the b-contact, and a c-contact. The a-contact of the relay 22 is connected to the W-phase output line. The b-contact of the relay 22 is connected to the b-contact of the relay 21 and the b-contact of the relay 23. The c-contact of the relay 22 is connected to one end of a V-phase stator winding 42. Note that another end of the V-phase stator winding 42 is connected to the V-phase output line.

The relay 23 includes an a-contact, the b-contact, and a c-contact. The a-contact of the relay 23 is connected to the U-phase output line. The b-contact of the relay 23 is connected to the b-contact of the relay 21 and the b-contact of the relay 22. The c-contact of the relay 23 is connected to one end of a W-phase stator winding 43. Note that another end of the W-phase stator winding 43 is connected to the W-phase output line.

The controller 3 illustrated in FIG. 1 receives a voltage value of the DC voltage source 5 acquired by a voltage detector 6 and a current value of the N bus line of the inverter 1 acquired by a current detector 7 as its inputs, and provides switching element drive signals to the inverter 1 and relay drive signals to the connection switching device 2 as its outputs.

Note that the current detector 7 is not limited to a specific configuration as long as the detector can acquire an electric current in each phase of the motor 4 that is a three-phase motor. The current detector 7 can also be exemplified by an AC current transformer, a DC current transformer, and a current circuit adopting a shunt resistor system.

Figure 2:
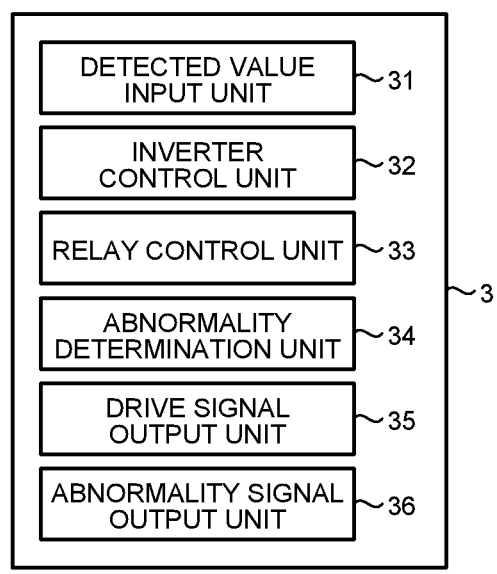
FIG. 2 is a functional block diagram of a controller of the motor drive system according to the first embodiment.

FIG. 2 is a functional block diagram of the controller 3. The controller 3 illustrated in FIG. 2 includes a detected value input unit 31, an inverter control unit 32, a relay control unit 33, an abnormality determination unit 34, a drive signal output unit 35, and an abnormality signal output unit 36.

The detected value input unit 31 acquires the voltage value of the DC voltage source 5 and the current value of the N bus line of the inverter 1.

The inverter control unit 32 is a switching element drive signal generating unit that generates switching element drive signals to control on/off of the switching element 11, the switching element 12, the switching element 13, the switching element 14, the switching element 15, and the switching element 16 of the inverter 1.

The relay control unit 33 is a relay drive signal generating unit that generates relay drive signals to control switching of the contacts of the relay 21, the relay 22, and the relay 23 of the connection switching device 2.

The abnormality determination unit 34 performs abnormality determination on a connection state of the stator winding 41, the stator winding 42, and the stator winding 43 by opening and closing of the relay 21, the relay 22, and the relay 23 of the connection switching device 2, as described later.

The drive signal output unit 35 outputs the switching element drive signal for the inverter 1 generated by the inverter control unit 32, and outputs the relay drive signal for the connection switching device 2 generated by the relay control unit 33.

When the abnormality determination unit 34 determines that the connection state of the connection switching device 2 is abnormal, the abnormality signal output unit 36 outputs an abnormality signal to a visual means such as a signal lamp or an indicator (not illustrated) to thereby notify a user of the abnormality. Note that a realization means for notification of abnormality is not limited to the visual means such as a signal lamp or an indicator, the notification of abnormality may be made using any other means. An example of the other means is some auditory means.

Figure 3:
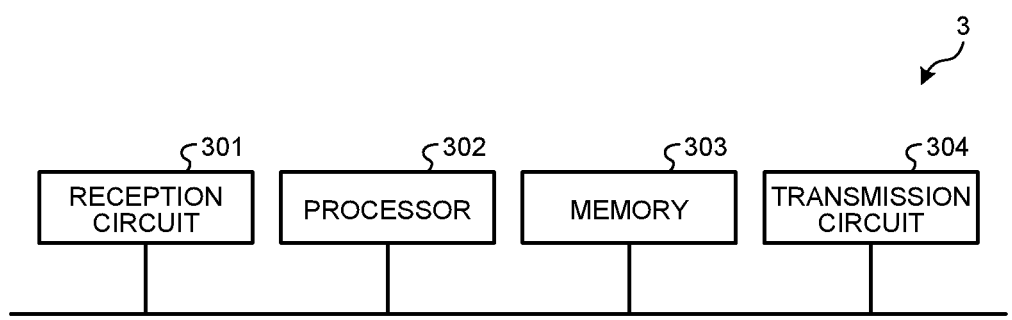
FIG. 3 is a diagram illustrating a configuration of hardware that can implement the controller of the motor drive system according to the first embodiment.

FIG. 3 is a diagram illustrating a configuration of hardware that can implement the controller 3. The controller 3 illustrated in FIG. 3 includes a reception circuit 301, a processor 302, a memory 303, and a transmission circuit 304.

The reception circuit 301 implements the detected value input unit 31 and acquires the voltage value of the DC voltage source 5 and the current value of the N bus line of the inverter 1. The voltage value and the current value inputted in the reception circuit 301 are stored in the memory 303.

The processor 302 implements the inverter control unit 32, the relay control unit 33, and the abnormality determination unit 34 by executing a control program and a determination program which are stored in the memory 303. The processor 302 performs calculation on the basis of the control program and determination program stored in the memory 303 as well as the voltage value of the DC voltage source 5 and the current value of the N bus line of the inverter 1 which are inputted in the processor, thereby to generate the switching element drive signals for the inverter 1 and the relay drive signals for the connection switching device 2.

The memory 303 stores required programs including the control program and the determination program. The memory 303 also provides storage areas for values necessary for the operation of the controller 3, such as the voltage value and current value inputted to the reception circuit 301 as well as operation values necessary for the calculation of the processor 302.

The transmission circuit 304 implements the drive signal output unit 35 and the abnormality signal output unit 36 on the basis of the calculation of the processor 302. The transmission circuit 304 outputs the switching element drive signals for the inverter 1, the relay drive signals for the connection switching device 2, and the abnormality signal of the connection switching device 2.

Although FIG. 3 illustrates the configuration in which only one is provided for each function, the present invention is not limited to this example, and two or more units may be provided for each function.

Figure 4:
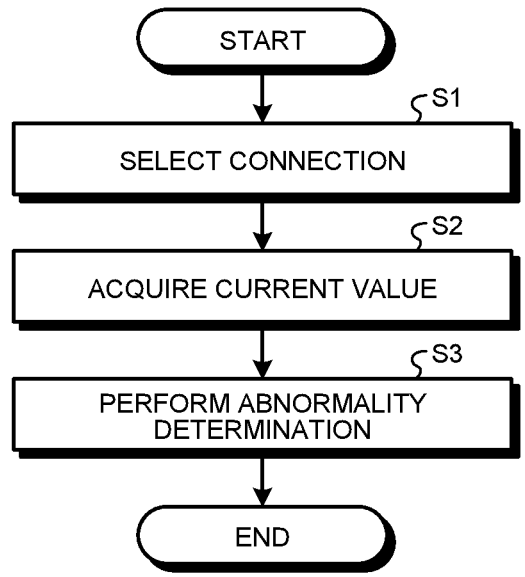
FIG. 4 is a flowchart illustrating an abnormality determination operation of the controller in the first embodiment.

FIG. 4 is a flowchart illustrating an abnormality determination operation of the controller 3. Note that the abnormality determination operation illustrated in FIG. 4 is performed while the motor 4 is stopped.

First, when the processing is started, the relay control unit 33 selects connection (S1). Specifically, the connection switching device 2 is caused to be in Y connection or Δ connection. Here, whether the connection switching device 2 is to be in the Y connection or Δ connection is selected on the basis of the connection state at the next startup of the motor 4. Note that the connection of the connection switching device 2 need not be switched if the connection state at the next startup of the motor 4 is the same as the connection state at the previous startup of the motor 4.

Next, the detected value input unit 31 acquires the current value Iuv, the current value Ivw, and the current value Iwu (S2). Although acquisition of the current value Iuv will be described in detail herein, the current value Ivw and the current value Iwu can be similarly acquired.

Note that the current value Iuv is a value of the current flowing from the U phase to the V phase based on pulse width modulation (PWM) output. The current value Ivw is a value of the current flowing from the V phase to the W phase based on the PWM output. The current value Iwu is a value of the current flowing from the W phase to the U phase based on the PWM output.

Figure 5:
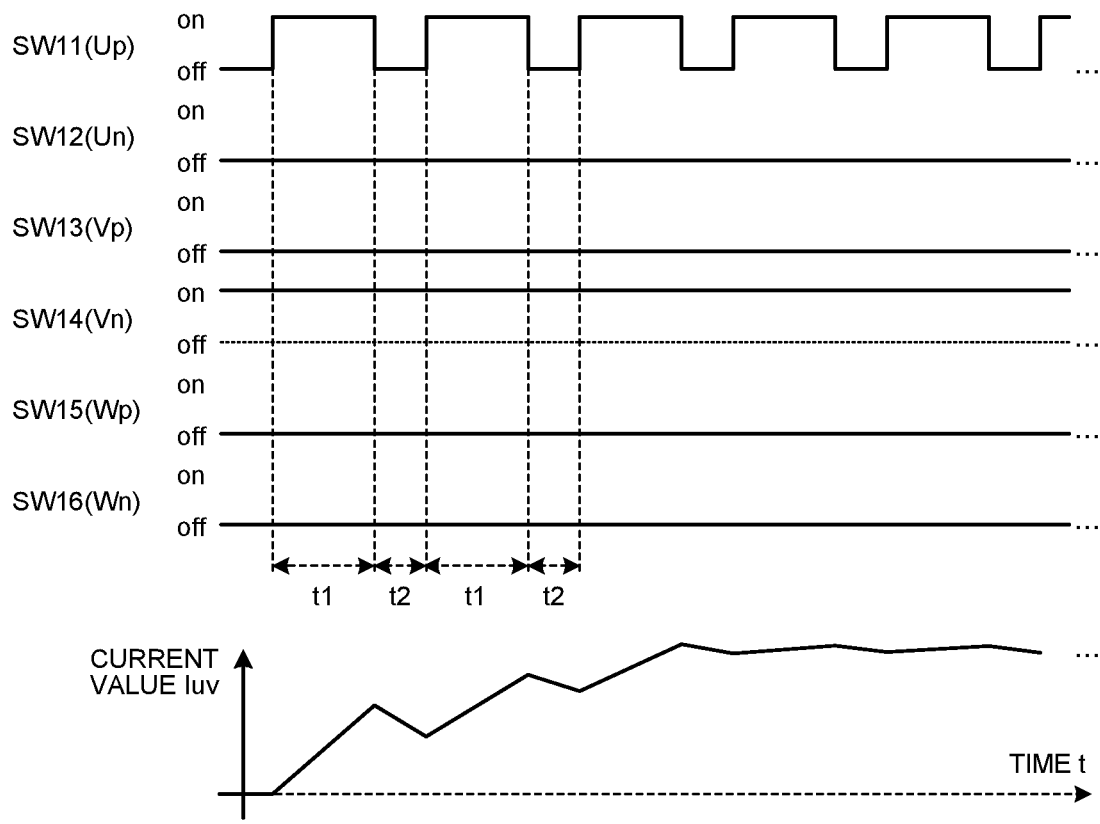
FIG. 5 is a set of charts illustrating on/off patterns of switching elements of an inverter and a temporal change in a current value Iuv at the time when the current value Iuv is acquired in the first embodiment.

FIG. 5 is a set of charts illustrating on/off patterns of the switching elements of the inverter 1 and a temporal change in the current value Iuv at the time of acquisition of the current value Iuv. The herein-mentioned switching elements of the inverter 1 are the switching element 11, the switching element 12, the switching element 13, the switching element 14, the switching element 15, and the switching element 16. Note that in FIG. 5, the switching element 11 is denoted as SW11, the switching element 12 is denoted as SW12, the switching element 13 is denoted as SW13, the switching element 14 is denoted as SW14, the switching element 15 is denoted as SW15, and the switching element 16 is denoted as SW16.

First, the controller 3 controls the switching element 12, the switching element 13, the switching element 15, and the switching element 16 to be fixed in OFF, the switching element 14 to be fixed in ON, and the switching element 11 to be ON for a first time t1. As a result, the voltage of the DC voltage source 5 is applied between the U phase and the V phase. The operation performed during the first time t1 is referred to as a first operation.

Next, the controller 3 controls the switching element 11 to be OFF for a second time t2 while fixing the on/off states of the switching element 12, the switching element 13, the switching element 14, the switching element 15, and the switching element 16. In response, the application of the voltage of the DC voltage source 5 is canceled. The operation performed during the second time t2 is referred to as a second operation. A drive signal for PWM control is generated by alternately repeating the first operation and the second operation for a third time. At this time, the detected value input unit 31 acquires the current value Iuv while the motor is driven by the drive signal in the PWM control.

Here, the current value Iuv gradually increases and then is saturated to a certain value as illustrated in FIG. 5, so that the third time needs to be longer than the time required for the saturation of the current value Iuv. Moreover, the saturation value of the current value Iuv is determined by the voltage value of the DC voltage source 5 as well as the first time t1 and the second time t2, as described later. Therefore, the first time t1 and the second time t2 need to be set such that the saturation value is in a range detectable by the current detector 7.

Next, the detected value input unit 31 acquires the current value Ivw. At the time of acquisition of the current value Ivw, the controller 3 controls the switching element 11, the switching element 12, the switching element 14, and the switching element 15 to be fixed in OFF, the switching element 16 to be fixed in ON, and the switching element 13 to be ON for the first time t1 to cause the elements to perform the first operation, and controls the switching element 13 to be OFF for the second time t2 to cause the elements to perform the second operation while fixing the on/off states of the switching element 11, the switching element 12, the switching element 14, the switching element 15, and the switching element 16. A drive signal for PWM control is generated by alternately repeating the first operation and the second operation for a third time. At this time, the detected value input unit 31 acquires the current value Ivw while the motor is driven by the drive signal in the PWM control.

Next, the detected value input unit 31 acquires the current value Iwu. At the time of acquisition of the current value Iwu, the controller 3 controls the switching element 11, the switching element 13, the switching element 14, and the switching element 16 to be fixed in OFF, the switching element 12 to be fixed in ON, and the switching element 15 to be ON for the first time t1 to cause the elements to perform the first operation, and controls the switching element 15 to be OFF for the second time t2 to cause the elements to perform the second operation while fixing the on/off states of the switching element 11, the switching element 12, the switching element 13, the switching element 14, and the switching element 16. A drive signal for PWM control is generated by alternately repeating the first operation and the second operation for a third time. At this time, the detected value input unit 31 acquires the current value Iwu while the motor is driven by the drive signal in the PWM control.

The controller 3 acquires the current value Iuv, the current value Ivw, and the current value Iwu as described above.

Now, the current value Iuv, the current value Ivw, and the current value Iwu corresponding to the connection state of the connection switching device 2 is described. First, an output voltage of the inverter 1 is calculated. As described above, at the time of acquisition of the current value Iuv, the current value Ivw, and the current value Iwu, the operation of applying the voltage of the DC voltage source 5 between two phases of the inverter 1 for the duration of the time t1 of a period of the time (t1+t2) is repeated. Then, with use of the voltage value Vdc of the DC voltage source 5, an output voltage Vout of the inverter 1 is expressed as Vout=Vdc×t1/(t1+t2).

Figure 6:
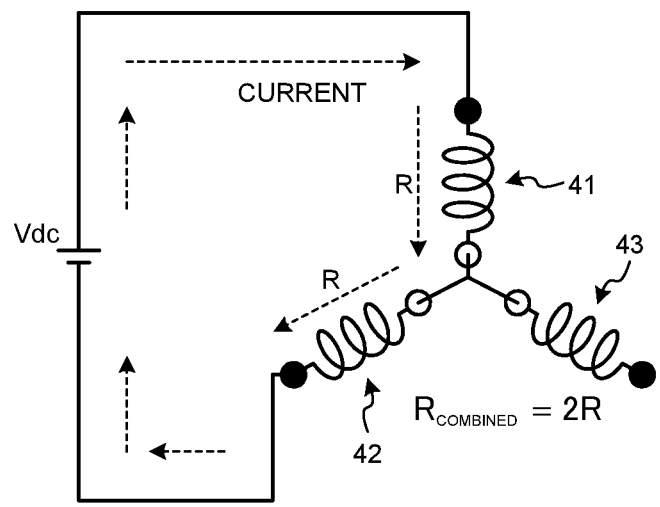
FIG. 6 is a diagram illustrating a current path when a connection state of a connection switching device is Y connection in the first embodiment.

FIG. 6 is a diagram illustrating a current path when the connection state of the connection switching device 2 is the Y connection. FIG. 6 illustrates the DC voltage source 5 and the stator windings 41, 42, and 43 and omits the other configurations. Note that in FIG. 6, a black circle represents an output line side terminal connected to the output line of each phase, and a white circle represents a relay side terminal connected to the c-terminal of the relay. FIG. 6 illustrates a state in which the relay side terminal of the stator winding 41, the relay side terminal of the stator winding 42, and the relay side terminal of the stator winding 43 are connected to each other. The state of FIG. 6 is realized by connecting the c-terminal of the relay 21 to the b-terminal thereof and connecting the c-terminal of the relay 22 to the b-terminal thereof in the connection switching device 2.

In FIG. 6, when "R" represents a resistance value which is an impedance value of each of the stator winding 41, the stator winding 42, and the stator winding 43, a combined resistance is equal to "2R" as the stator winding 41 and the stator winding 42 are connected in series to each other. Therefore, a current value IY of the current flowing is expressed as IY=Vdc×{t1/(t1+t2)}×(1/2R).

Figure 7:
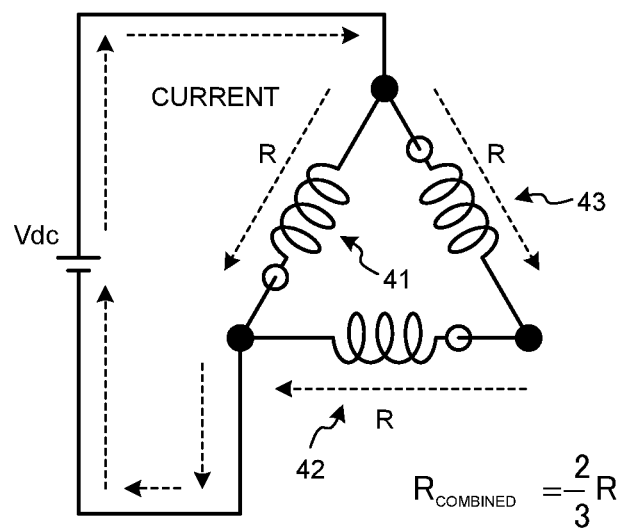
FIG. 7 is a diagram illustrating a current path when a connection state of the connection switching device is Δ connection in the first embodiment.

FIG. 7 is a diagram illustrating a current path when the connection state of the connection switching device 2 is the Δ connection. FIG. 7 illustrates the DC voltage source 5 and the stator windings 41, 42, and 43 and omits the other configurations. Note that in FIG. 7, a black circle represents an output line side terminal connected to the output line of each phase, and a white circle represents a relay side terminal connected to the c-terminal of the relay. FIG. 7 illustrates a state in which the relay side terminal of the stator winding 41 is connected to the output line side terminal of the stator winding 42, the relay side terminal of the stator winding 42 is connected to the output line side terminal of the stator winding 43, and the relay side terminal of the stator winding 43 is connected to the output line side terminal of the stator winding 41. The state of FIG. 7 is realized by connecting the c-terminal of the relay 21 to the a-terminal thereof, connecting the c-terminal of the relay 22 to the a-terminal thereof, and connecting the c-terminal of the relay 23 to the a-terminal thereof in the connection switching device 2.

In FIG. 7, when "R" represents the resistance value which is the impedance value of each of the stator winding 41, the stator winding 42, and the stator winding 43 as in FIG. 6, a combined resistance is equal to 2R/3 as the stator winding 42 and the stator winding 43 are connected in series to each other, and the stator winding 41 is connected in parallel with the serially-connected stator winding 42 and stator winding 43. Therefore, a current value IΔ of the current flowing is expressed as IΔ=Vdc×{t1/(t1+t2)}×(3/2R).

Next, an example of a misconnection, that is, an abnormal connection state, will be described with reference to FIGS. 8 to 11. FIG. 6 or 7 illustrates the state in which the connection state of the connection switching device 2 is the Y connection or Δ connection with normality, but when the connection switching device 2 is in abnormal connection, the combined resistance and the current value are different from those in FIG. 6 or 7.

Note that FIGS. 8 to 11 each illustrate the connection state of the stator winding 41, the stator winding 42, and the stator winding 43 of the motor 4. In FIGS. 8 to 11, a black circle represents an output line side terminal, and a white circle represents a relay side terminal.

Figure 8:
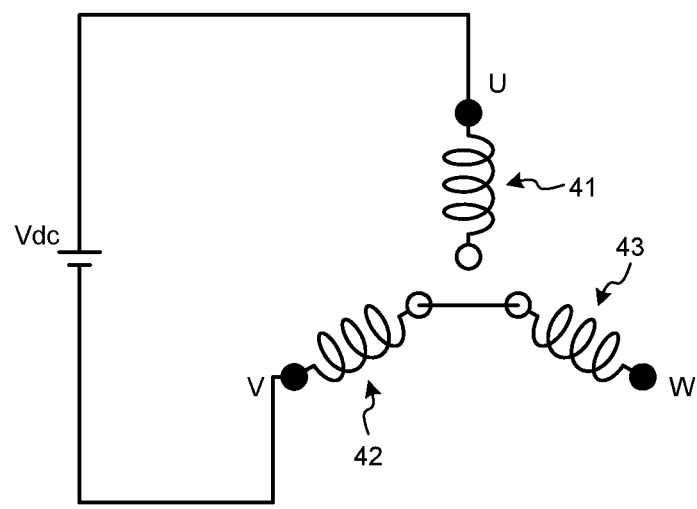
FIG. 8 is a diagram illustrating a first example of an abnormal connection state in the first embodiment.

FIG. 8 is a diagram illustrating a first example of an abnormal connection state. FIG. 8 illustrates the DC voltage source 5 and the stator windings 41, 42, and 43, and omits the other configurations. FIG. 8 illustrates a state in which the relay side terminal of the stator winding 41 is connected to nothing, and the relay side terminal of the stator winding 42 is connected to the relay side terminal of the stator winding 43. The state of FIG. 8 is realized by connecting the c-terminal of the relay 21 to nothing, connecting the c-terminal of the relay 22 to the b-terminal thereof, and connecting the c-terminal of the relay 23 to the b-terminal thereof in the connection switching device 2. In this configuration, the impedance between the U phase and the V phase and the impedance between the W phase and the U phase are infinite, and the impedance between the V phase and the W phase is twice an impedance Z of each stator winding.

Figure 9:
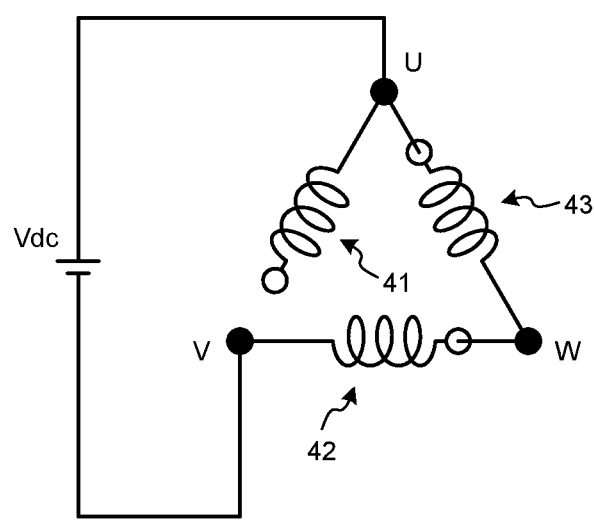
FIG. 9 is a diagram illustrating a second example of an abnormal connection state in the first embodiment.

FIG. 9 is a diagram illustrating a second example of an abnormal connection state. FIG. 9 illustrates the DC voltage source 5 and the stator windings 41, 42, and 43, and omits the other configurations. FIG. 9 illustrates a state in which the relay side terminal of the stator winding 41 is connected to nothing, the relay side terminal of the stator winding 42 is connected to the output side terminal of the stator winding 43, and the relay side terminal of the stator winding 43 is connected to the output side terminal of the stator winding 41. The state of FIG. 9 is realized by connecting the c-terminal of the relay 21 to nothing, connecting the c-terminal of the relay 22 to the a-terminal thereof, and connecting the c-terminal of the relay 23 to the a-terminal thereof in the connection switching device 2. In this configuration, the impedance between the U phase and the V phase is twice the impedance Z of each stator winding, the impedance between the V phase and the W phase is equal to the impedance Z of each stator winding, and the impedance between the W phase and the U phase is also equal to the impedance Z of each stator winding.

Figure 10:
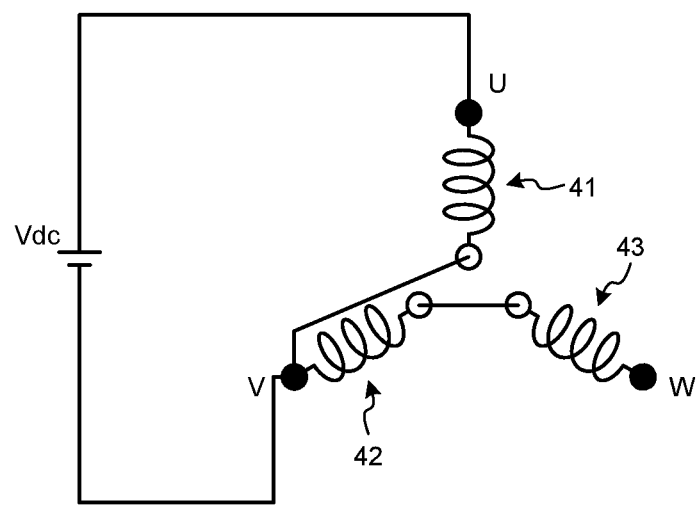
FIG. 10 is a diagram illustrating a third example of an abnormal connection state in the first embodiment.

FIG. 10 is a diagram illustrating a third example of an abnormal connection state. FIG. 10 illustrates the DC voltage source 5 and the stator windings 41, 42, and 43 and omits the other configurations. FIG. 10 illustrates a state in which the relay side terminal of the stator winding 41 is connected to the output line side terminal of the stator winding 42, and the relay side terminal of the stator winding 42 is connected to the relay side terminal of the stator winding 43. The state of FIG. 10 is realized by connecting the c-terminal of the relay 21 to the a-terminal thereof, connecting the c-terminal of the relay 22 to the b-terminal thereof, and connecting the c-terminal of the relay 23 to the b-terminal thereof in the connection switching device 2. In this configuration, the impedance between the U phase and the V phase is equal to the impedance Z of each stator winding, the impedance between the V phase and the W phase is twice the impedance Z of each stator winding, and the impedance between the W phase and the U phase is three times the impedance Z of each stator winding.

Figure 11:
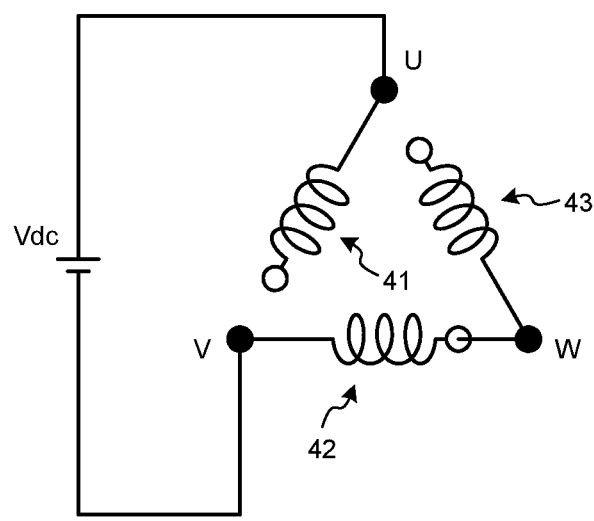
FIG. 11 is a diagram illustrating a fourth example of an abnormal connection state in the first embodiment.

FIG. 11 is a diagram illustrating a fourth example of an abnormal connection state. FIG. 11 illustrates the DC voltage source 5 and the stator windings 41, 42, and 43 and omits the other configurations. In FIG. 11, the relay side terminal of the stator winding 41 is connected to nothing, the relay side terminal of the stator winding 42 is connected to the output line side terminal of the stator winding 43, and the relay side terminal of the stator winding 43 is connected to nothing. The state of FIG. 11 is realized by connecting the c-terminal of the relay 21 to nothing, connecting the c-terminal of the relay 22 to the a-terminal thereof, and connecting the c-terminal of the relay 23 to nothing in the connection switching device 2. In this configuration, the impedance between the U phase and the V phase and the impedance between the W phase and the U phase are infinite, and the impedance between the V phase and the W phase is equal to the impedance Z of each stator winding.

The connection state illustrated in each of FIGS. 8 to 11 has impedances different from those in FIGS. 6 and 7, whereby it can be understood that the current value Iu, the current value Iv, and the current value Iw are different from those in FIGS. 6 and 7. Note that the connection states illustrated in FIGS. 8 to 11 are examples of the abnormal connection states, where abnormal connection states of the present invention are not necessarily limited to the connection states illustrated in FIGS. 8 to 11.

Now the description returns to the flowchart of FIG. 4. In the next stage, the abnormality determination unit 34 performs abnormality determination on the connection state using the current value Iuv, the current value Ivw, and the current value Iwu (S3).

Figure 12:
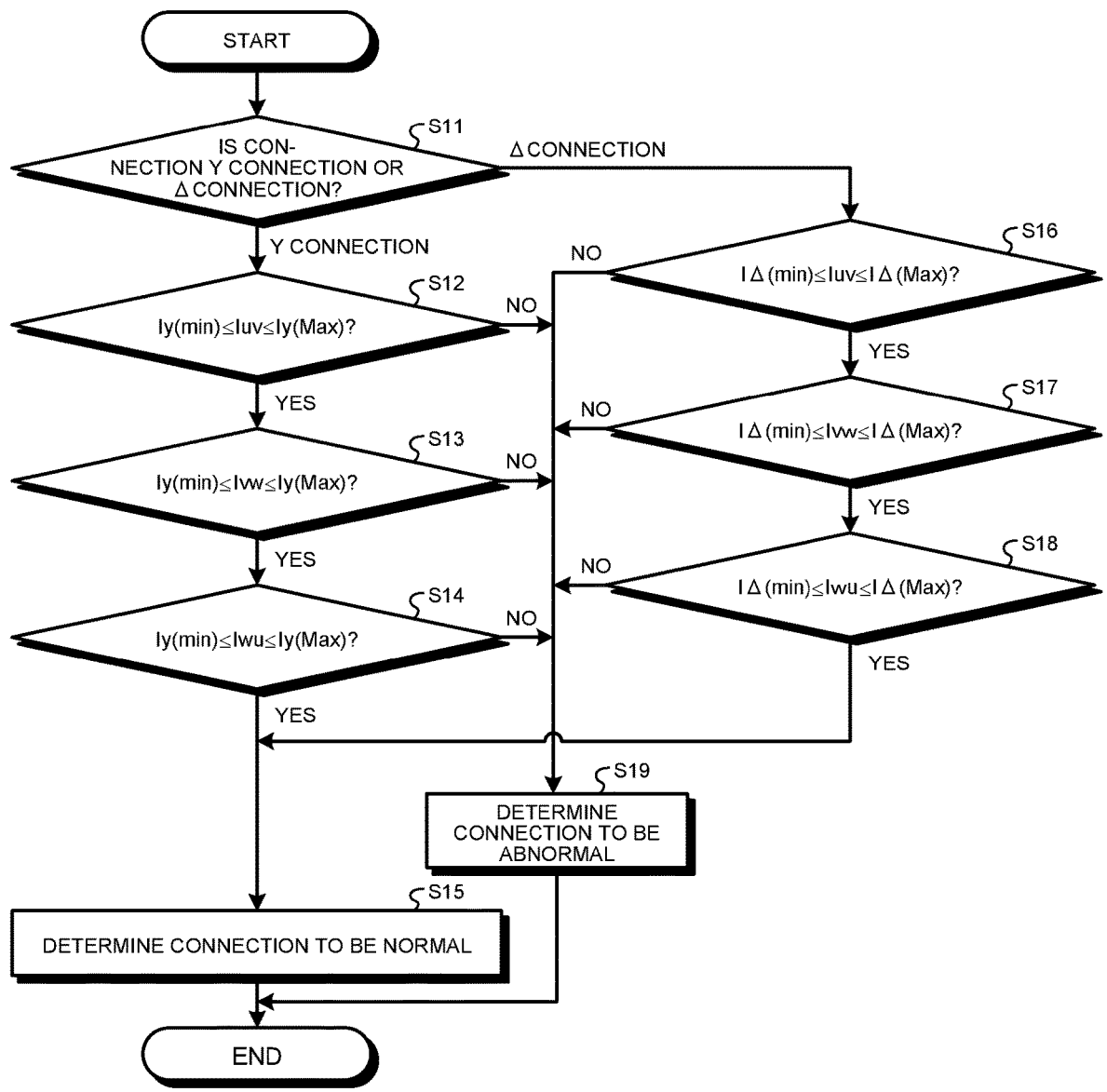
FIG. 12 is a flowchart illustrating details of abnormality determination in the first embodiment.

FIG. 12 is a flowchart illustrating details of the abnormality determination in S3 of FIG. 4. Here, "Iy(min)" and "Iy(Max)" represent the lower limit and the upper limit of the current value in a state of the normal Y connection illustrated in FIG. 6, respectively. In addition, "IΔ(min)" and "IΔ(Max)" represent the lower limit and the upper limit of the current value in a state of the normal Δ connection illustrated in FIG. 7, respectively.

First, when the processing is started, the abnormality determination unit 34 determines whether the connection state of the connection switching device 2 achieved by the relay control unit 33 is the Y connection or Δ connection (S11). If the connection state of the connection switching device 2 is the Y connection (Y connection in S11), the abnormality determination unit 34 determines whether or not Iy(min)≤Iuv≤Iy(Max) is held (S12). If Iy(min)≤Iuv≤Iy(Max) is held (Yes in S12), the abnormality determination unit 34 determines whether or not Iy(min)≤Ivw≤Iy(Max) is held (S13). If Iy(min)≤Ivw≤Iy(Max) is held (Yes in S13), the abnormality determination unit 34 determines whether or not Iy(min)≤Iwu≤Iy(Max) is held (S14). If Iy(min)≤Iwu≤Iy(Max) is held (Yes in S14), the abnormality determination unit 34 determines that the connection is normal (S15), and ends the processing.

If the connection state of the connection switching device 2 is the Δ connection (Δ connection in S11), the abnormality determination unit 34 determines whether or not IΔ(min)≤Iuv≤IΔ(Max) is held (S16). If IΔ(min)≤Iuv≤IΔ(Max) is held (Yes in S16), the abnormality determination unit 34 determines whether or not IΔ(min)≤Ivw≤IΔ(Max) is held (S17). If IΔ(min)≤Ivw≤IΔ(Max) is held (Yes in S17), the abnormality determination unit 34 determines whether or not IΔ(min)≤Iwu≤IΔ(Max) is held (S18). If IΔ(min)≤Iwu≤IΔ(Max) is held (Yes in S18), the abnormality determination unit 34 determines that the connection is normal (S15), and ends the processing.

Note that if a determination result of any of S12, S13, S14, S16, S17, and S18 is No, the abnormality determination unit 34 determines that the connection is abnormal (S19) and ends the processing, thereby ending the abnormality determination on the connection state in S3 of FIG. 4.

It is noted in this example that for the current value when the connection state is determined to be normal, a range is set with both the maximum value and the minimum value being set in consideration of a margin. This margin is set because the coil resistance of the motor 4 or the DC voltage changes due to the temperature at the time of operation or production tolerance.

Although the determination operations for the current value Iuv, the current value Ivw, and the current value Iwu are performed in this order in FIG. 12, the order of determination operations may be changed.

Note that the current path is not necessarily limited to the aforementioned current path as long as three kinds of currents between the terminals of the inverter 1 can be acquired.

In addition, the pattern of the PWM output is not limited to the aforementioned pattern as long as the output voltage can be controlled.

Furthermore, "Iy(min)", "Iy(Max)", "IΔ(min)", and "IΔ(Max)" that are determination values used in the aforementioned abnormality determination may be changed in their settings depending on the operating conditions. For example, since the coil resistance R of the motor 4 changes with temperature, a temperature of a predetermined part inside or around the motor 4 may be measured to change the determination values Iy(min), Iy(Max), IΔ(min), and IΔ(Max) on the basis of the measured temperature.

The abnormality determination on the connection state of the connection switching device 2 can be performed as described in the present embodiment.

In a conventional motor drive system including a connection switching device, it is impossible to detect that the connection state of the connection switching device is abnormal, and the motor can be driven in a state in which the connection state of the connection switching device is abnormal, that is, in a state of misconnection thereof. Then, when the motor is driven with a misconnection, however, the inverter or the motor may fail due to overcurrent. In the circumstances, as described in the present embodiment, a misconnection state can be detected by determining that the connection state is abnormal when a connection state instructed by the controller 3 is different from an actual connection state, whereby a secondary failure of the inverter 1 or the motor 4 due to the misconnection state can be prevented.

Second Embodiment

In the first embodiment, description has been given for a form in which it is determined whether the connection state of the connection switching device 2 is normal or abnormal using the upper limit value and lower limit value of the current value in case of the Y connection, or the upper limit value and lower limit value of the current value in the case of Δ connection. However, depending on the temperature characteristics and production tolerance of the stator windings 41, 42, and 43 of the motor 4, the upper limit value of the current value in the case of Y connection may overlap with the lower limit value of the current value in the case of Δ connection, thereby possibly leading to great difficulty in abnormality determination. In the circumstances, the present embodiment is made to detect abnormality of the connection state using the fact that the current value Iuv, the current value Ivw, and the current value Iwu are not equal when the connection state of the connection switching device 2 is abnormal. It should be noted that the herein-said "equal" refers to not only a case of "completely equal" but also a case of "substantially equal", and it is assumed that the values are considered to be equal when they are within a set range for equality.

Note that the present embodiment is similar to the first embodiment except for the details of the abnormality determination in S3 of FIG. 4, and so the description of the first embodiment is to be cited for the same points as the first embodiment. That is, the motor drive system 100 of the present embodiment has the configuration illustrated in FIG. 1, and the abnormality determination operation of the controller 3 corresponds to an operation illustrated in the flowchart of FIG. 4.

Figure 13:
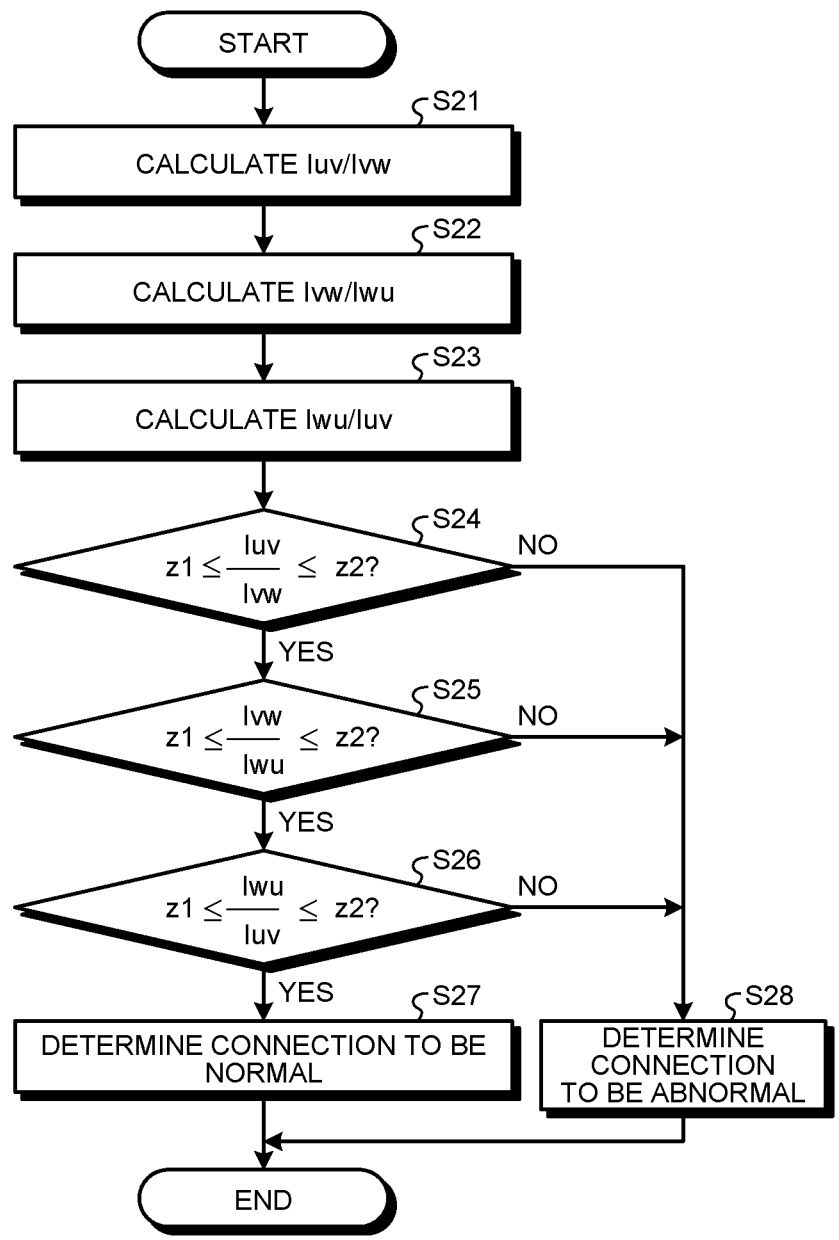
FIG. 13 is a flowchart illustrating details of abnormality determination in a second embodiment.

FIG. 13 is a flowchart illustrating the details of the abnormality determination in S3 of FIG. 4 in the present embodiment.

First, when the processing is started, the abnormality determination unit 34 calculates a current value ratio Iuv/Ivw (S21), calculates a current value ratio Ivw/Iwu (S22), and calculates a current value ratio Iwu/Iuv (S23).

Next, the abnormality determination unit 34 determines whether or not z1≤Iuv/Ivw≤z2 is satisfied (S24). If z1≤Iuv/Ivw≤z2 is satisfied (Yes in S24), the abnormality determination unit 34 determines whether or not z1≤Ivw/Iwu≤z2 is satisfied (S25). If z1≤Ivw/Iwu≤z2 is satisfied (Yes in S25), the abnormality determination unit 34 determines whether or not z1≤Iwu/Iuv≤z2 is satisfied (S26). If z1≤Iwu/Iuv≤z2 is satisfied (Yes in S26), the abnormality determination unit 34 determines that the connection is normal (S27), and ends the processing.

Here, "z1" and "z2" are determination values set in consideration of the temperature characteristics and production tolerance of the stator windings 41, 42, and 43, and are each set to a value close to 1 and satisfying z1<1<z2.

Note that if the determination result of any of S24, S25, and S26 above is No, the abnormality determination unit 34 determines that the connection is abnormal (S28) and ends the processing.

This is because the current value Iuv, the current value Ivw, and the current value Iwu are equal when the connection state of the connection switching device 2 is normal, and the current value Iuv, the current value Ivw, and the current value Iwu are not equal when the connection state of the connection switching device 2 is abnormal.

Note that the two determination values z1 and z2 are used to set a margin as in the first embodiment.

According to the present embodiment, the abnormality determination on the connection state of the connection switching device 2 can be performed without acquiring information on whether the connection state of the connection switching device 2 is the Y connection or Δ connection.

Although the present embodiment calculates the current value ratio Iuv/Ivw, the current value ratio Ivw/Iwu, and the current value ratio Iwu/Iuv, a combination of the current value ratios is not limited to this example. A current value ratio Iuv/Iwu, a current value ratio Ivw/Iuv, or a current value ratio Iwu/Ivw may be used as the current value ratio. Alternatively, current value ratios Ivw/Iuv, Iwu/Ivw, Iuv/Iwu, Iwu/Iuv, Iuv/Ivw, and Ivw/Iwu obtained by reversing the denominators and numerators of these ratios may be used.

Third Embodiment

In the first embodiment, description has been given for a form in which it is determined whether the connection state of the connection switching device 2 is normal or abnormal using the upper limit value and lower limit value of the current value in the case of Y connection, or the upper limit value and lower limit value of the current value in the case of Δ connection. Moreover, in the second embodiment, description has been given for a form in which it is determined whether the connection state of the connection switching device 2 is normal or abnormal depending on whether or not the current value Iuv, the current value Ivw, and the current value Iwu are equal irrespective of whether the connection is the Y connection or Δ connection. In the present embodiment, description will be given for a form in which the first embodiment and the second embodiment are combined.

Note that the present embodiment is similar to the first and second embodiments except for the details of the abnormality determination in S3 of FIG. 4, and so the descriptions of the first and second embodiments are to be cited for the same points as the first and second embodiments. That is, the motor drive system 100 of the present embodiment has the configuration illustrated in FIG. 1, and the abnormality determination operation of the controller 3 corresponds to an operation illustrated in the flowchart of FIG. 4.

Figure 14:
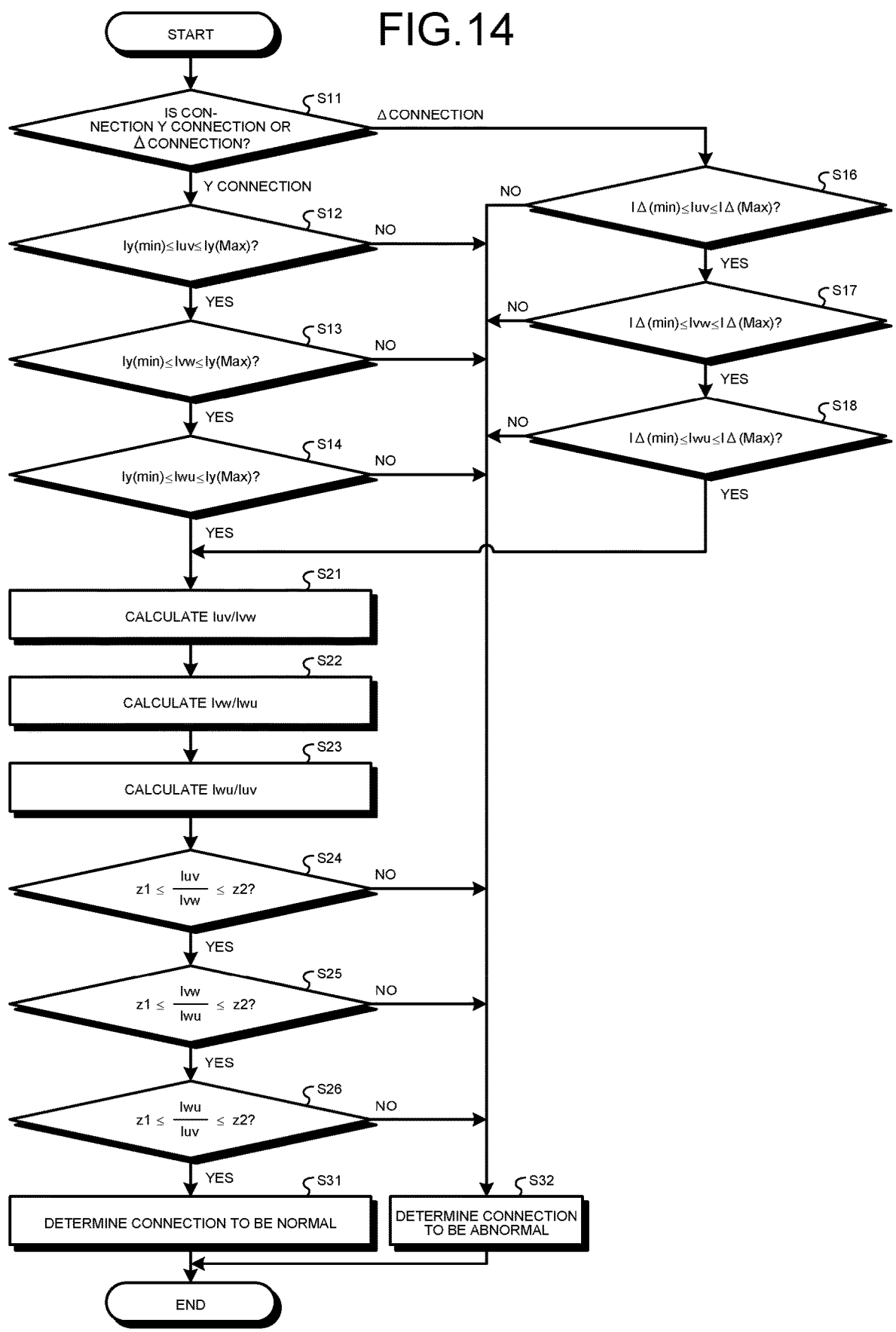
FIG. 14 is a flowchart illustrating details of abnormality determination in a third embodiment.

FIG. 14 is a flowchart illustrating the details of the abnormality determination in S3 of FIG. 4 in the present embodiment.

First, when the processing is started, the abnormality determination unit 34 determines whether the connection state of the connection switching device 2 is the Y connection state or Δ connection state as in the first embodiment, and determines whether or not the current value Iuv, the current value Ivw, and the current value Iwu are within an allowable range in each connection state. If all of the current value Iuv, the current value Ivw, and the current value Iwu are within the allowable range, the abnormality determination unit 34 calculates the current value ratio Iuv/Ivw, the current value ratio Ivw/Iwu, and the current value ratio Iwu/Iuv as in the second embodiment and determines whether or not all of the current value ratio Iuv/Ivw, the current value ratio Ivw/Iwu, and the current value ratio Iwu/Iuv are larger than or equal to the determination value z1 and smaller than or equal to the determination value z2.

If all of the current value ratio Iuv/Ivw, the current value ratio Ivw/Iwu, and the current value ratio Iwu/Iuv are larger than or equal to the determination value z1 and smaller than or equal to the determination value z2, the abnormality determination unit 34 determines that the connection is normal (S31) and ends the processing.

Note that, in FIG. 14, if the determination result of any of S12, S13, S14, S16, S17, S18, S24, S25, and S26 is "No", the abnormality determination unit 34 determines that the connection is abnormal (S32) and ends the processing.

According to the present embodiment, it is possible to detect abnormality of the connection state with high accuracy using the fact that the current value Iuv, the current value Ivw, and the current value Iwu are not equal in the event of abnormal connection even if the temperature characteristics or production tolerance of the stator windings 41, 42, and 43 of the motor 4 cause each current value to fall within the allowable range in each connection state though the connection state is really abnormal.

Fourth Embodiment

In the second embodiment, description has been given for a form in which it is determined whether the connection state of the connection switching device 2 is normal or abnormal depending on whether or not the current value Iuv, the current value Ivw, and the current value Iwu are equal irrespective of whether the connection is the Y connection or Δ connection. The present embodiment determines whether or not the current value Iuv, the current value Ivw, and the current value Iwu are equal in each of the cases of Y connection and Δ connection, and when the current values are equal, it calculates a ratio of a total value of the current values in the case of Y connection and a total value of the current values in the case of Δ connection and determines that the connection state is normal when the ratio of the total values of the current values is larger than or equal to a determination value z3 and smaller than or equal to a determination value z4, the determination values being set for the ratio of the total values of the current values.

Note that the present embodiment is similar to the first to third embodiments except for the details of the abnormality determination in S3 of FIG. 4, and so the descriptions of the first to third embodiments are to be cited for the same points as the first to third embodiments. That is, the motor drive system 100 of the present embodiment has the configuration illustrated in FIG. 1, and the abnormality determination operation of the controller 3 corresponds to an operation illustrated in the flowchart of FIG. 4.

Figure 15:
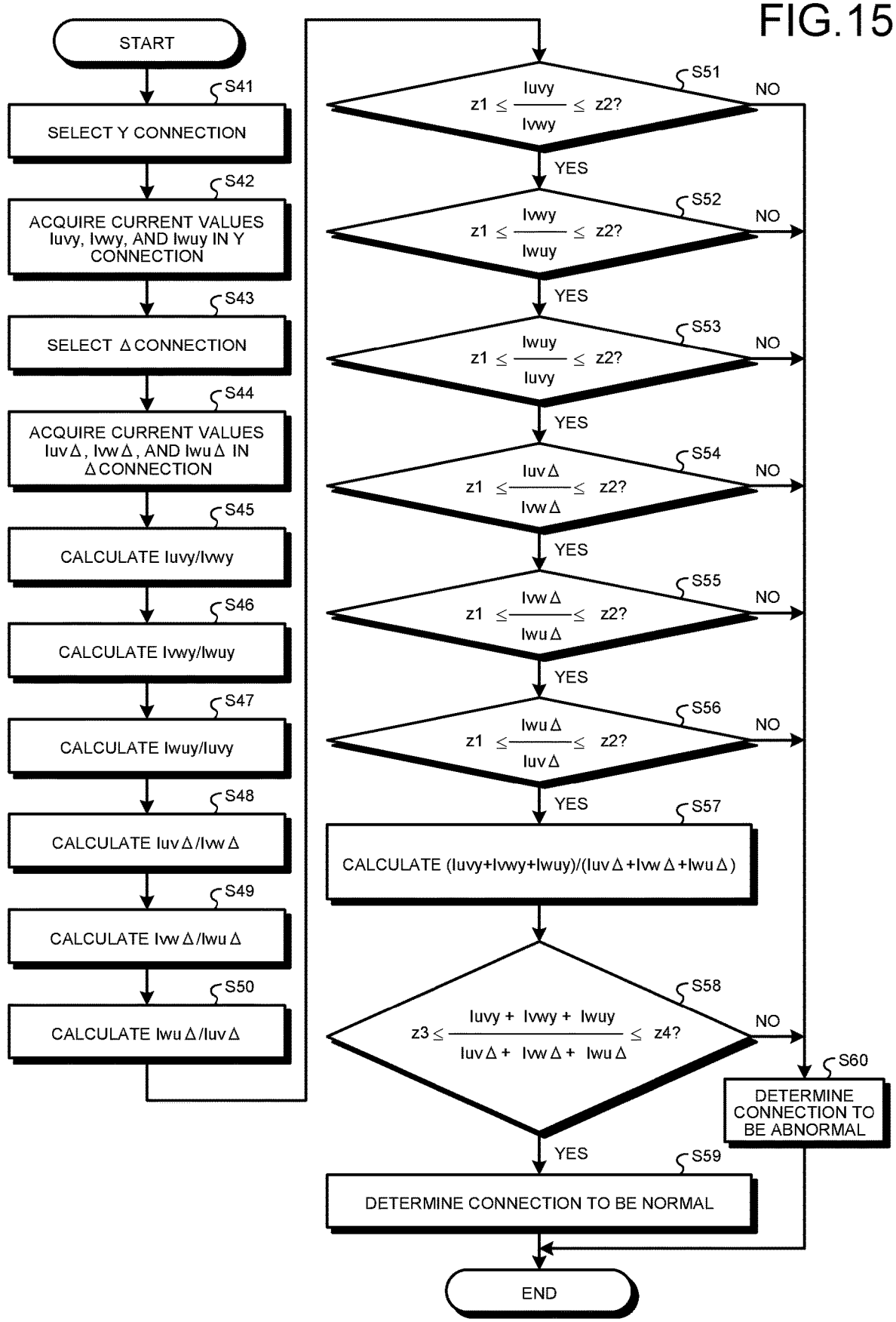
FIG. 15 is a flowchart illustrating details of abnormality determination in a fourth embodiment.

FIG. 15 is a flowchart illustrating the details of the abnormality determination in S3 of FIG. 4 according to the present embodiment.

First, when the processing is started, the relay control unit 33 selects the Y connection (S41). The abnormality determination unit 34 acquires a current value Iuvy that is the current value Iuv in the case of Y connection, a current value Ivwy that is the current value Ivw in the case of Y connection, and a current value Iwuy that is the current value Iwu in the case of Y connection (S42). Next, the relay control unit 33 selects the Δ connection (S43). The abnormality determination unit 34 acquires a current value IuvΔ that is the current value Iuv in the case of Δ connection, a current value IvwΔ that is the current value Ivw in the case of Δ connection, and a current value IwuΔ that is the current value Iwu in the case of Δ connection (S44).

Next, the abnormality determination unit 34 calculates a current value ratio Iuvy/Ivwy (S45), calculates a current value ratio Ivwy/Iwuy (S46), calculates a current value ratio Iwuy/Iuvy (S47), calculates a current value ratio IuvΔ/IvwΔ (S48), calculates a current value ratio IvwΔ/IwuΔ (S49), and calculates a current value ratio IwuΔ/IuvΔ (S50).

Next, the abnormality determination unit 34 determines whether or not $z1 \leq Iuvy/Ivwy \leq z2$ is satisfied (S51). If $z1 \leq Iuvy/Ivwy \leq z2$ is satisfied (Yes in S51), the abnormality determination unit 34 determines whether or not $z1 \leq Ivwy/Iwuy \leq z2$ is satisfied (S52). If $z1 \leq Ivwy/Iwuy \leq z2$ is satisfied (Yes in S52), the abnormality determination unit 34 determines whether or not $z1 \leq Iwuy/Iuvy \leq z2$ is satisfied (S53). If $z1 \leq Iwuy/Iuvy \leq z2$ is satisfied (Yes in S53), the abnormality determination unit 34 determines whether or not $z1 \leq IuvΔ/IvwΔ \leq z2$ is satisfied (S54). If $z1 \leq IuvΔ/IvwΔ \leq z2$ is satisfied (Yes in S54), the abnormality determination unit 34 determines whether or not $z1 \leq IvwΔ/IwuΔ \leq z2$ is satisfied (S55). If $z1 \leq IvwΔ/IwuΔ \leq z2$ is satisfied (Yes in S55), the abnormality determination unit 34 determines whether or not $z1 \leq IwuΔ/IuvΔ \leq z2$ is satisfied (S56).

If $z1 \leq IwuΔ/IuvΔ \leq z2$ is satisfied (Yes in S56), the abnormality determination unit 34 calculates (Iuvy+Ivwy+Iwuy)/(IuvΔ+IvwΔ+IwuΔ) (S57). That is, the ratio of the total value of the current values in the case of Y connection and the total value of the current values in the case of Δ connection is calculated. The abnormality determination unit 34 then determines whether or not the ratio of the total values of the current values (Iuvy+Ivwy+Iwuy)/(IuvΔ+IvwΔ+IwuΔ) is larger than or equal to the determination value z3 and smaller than or equal to the determination value z4 (S58). If $z3 \leq (Iuvy+Ivwy+Iwuy)/(IuvΔ+IvwΔ+IwuΔ) \leq z4$ is satisfied (Yes in S58), the abnormality determination unit 34 determines that the connection is normal (S59) and ends the processing.

Here, z3 and z4 are the determination values set for the ratio of the total values of the current values. Moreover, since the resistance value in the Δ connection is one-third the resistance value in the Y connection, the current value in the Δ connection is three times the current value in the Y connection. Accordingly, if the connection state is normal, (Iuvy+Ivwy+Iwuy)/(IuvΔ+IvwΔ+IwuΔ) equals a value close to 3. Therefore, z3 and z4 are each set to a value close to 3 and satisfying z3<3<z4.

Note that if the determination result of any of S51, S52, S53, S54, S55, S56, and S58 above is "No", the abnormality determination unit 34 determines that the connection is abnormal (S60) and ends the processing.

The present embodiment checks the connection state before and after switching between the Y connection and the Δ connection, and further compares changes in the current values before and after the switching. Therefore, the determination on whether the connection is normal or abnormal can be made more accurately than in the first to third embodiments so that a misconnection can be detected with high accuracy.

Although the processing in FIG. 15 measures the current values in the Y connection and thereafter switches to the Δ connection to measure the current values in the A connection, the present invention is not limited to this example, and after the current values in the Δ connection are measured, switching to the Y connection may be performed to measure the current values in the Y connection.

Fifth Embodiment

While the first to fourth embodiments acquire the current value with the current being passed between the two terminals, the present invention is not limited to this example. In the present embodiment, the current value is acquired by passing the current among three terminals.

Note that the present embodiment is similar to the first to fourth embodiments except that the current is passed through three terminals, and so the descriptions of the first to fourth embodiments are to be cited for the same points as the first to fourth embodiments. That is, the motor drive system 100 of the present embodiment has the configuration illustrated in FIG. 1, and the abnormality determination operation of the controller 3 corresponds to an operation illustrated in the flowchart of FIG. 4.

Figure 16:
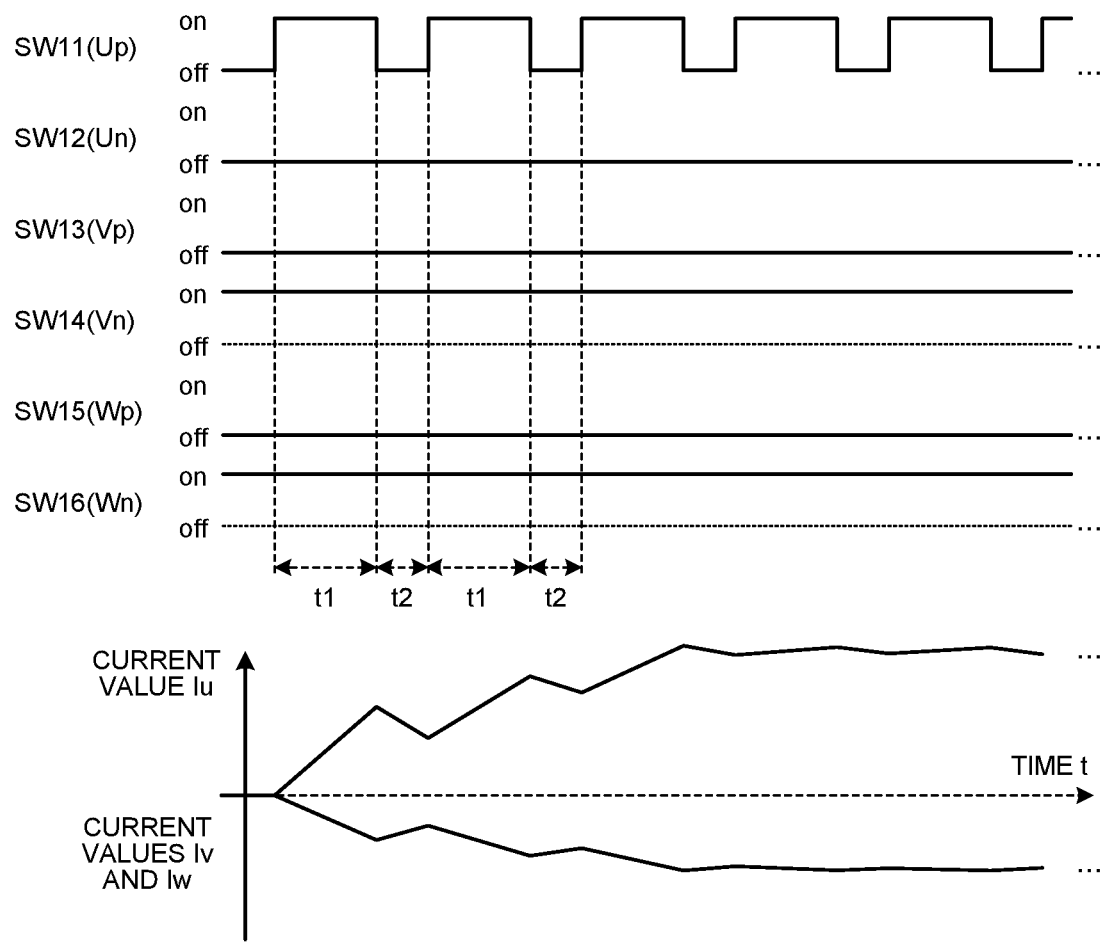
FIG. 16 is a set of charts illustrating on/off patterns of switching elements of an inverter and temporal changes in a current value Iuv, a current value Ivw, and a current value Iwu at the time when the current value Iuv, the current value Ivw, and the current value Iwu are acquired in a fifth embodiment.

FIG. 16 is a set of charts illustrating on/off patterns of the switching elements of the inverter 1 and temporal changes in the current value Iuv, the current value Ivw, and the current value Iwu at the time of acquisition of the current value Iuv, the current value Ivw, and the current value Iwu in the present embodiment. Note that in FIG. 16 as well, as in FIG. 5, the switching element 11 is denoted as SW11, the switching element 12 is denoted as SW12, the switching element 13 is denoted as SW13, the switching element 14 is denoted as SW14, the switching element 15 is denoted as SW15, and the switching element 16 is denoted as SW16.

First, the controller 3 controls the switching element 12, the switching element 13, and the switching element 15 to be fixed in OFF, the switching element 14 and the switching element 16 to be fixed in ON, and the switching element 11 to be ON for the first time t1. As a result, the voltage of the DC voltage source 5 is applied between the U phase and the V phase and between the U phase and the W phase. The operation performed during the first time t1 is referred to as a first operation.

Next, the controller 3 controls the switching element 11 to be OFF for a second time t2 while fixing the on/off states of the switching element 12, the switching element 13, the switching element 14, the switching element 15, and the switching element 16. In response, the application of the voltage of the DC voltage source 5 is canceled. The operation performed during the second time t2 is referred to as a second operation. A drive signal for PWM control is generated by alternately repeating the first operation and the second operation for a third time. At this time, the detected value input unit 31 acquires the current value Iuv and the current value Iwu during a period in which the motor is driven by the drive signal in the PWM control.

Since the current value Iuv, the current value Ivw, and the current value Iwu change gradually and then are saturated to certain values as illustrated in FIG. 16, the third time needs to be longer than the time required for the saturation of each current value. Moreover, the saturation value of each current value is determined by the voltage value of the DC voltage source 5 and the first time t1 and the second time t2, as described later. Therefore, the first time t1 and the second time t2 need to be set such that the saturation values are in a range detectable by the current detector 7.

Figure 17:
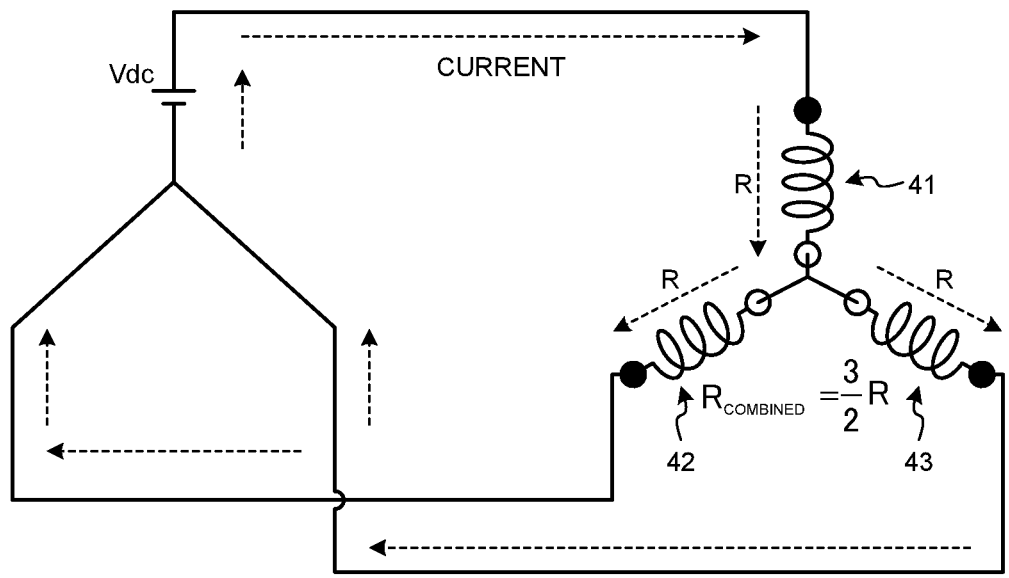
FIG. 17 is a diagram illustrating a current path when a connection state of a connection switching device is Y connection in the fifth embodiment.

FIG. 17 is a diagram illustrating a current path when the connection state of the connection switching device 2 is the Y connection in the present embodiment. In FIG. 17, assuming that "R" is the resistance value of each of the stator winding 41, the stator winding 42, and the stator winding 43, a combined resistance is 3R/2.

Figure 18:
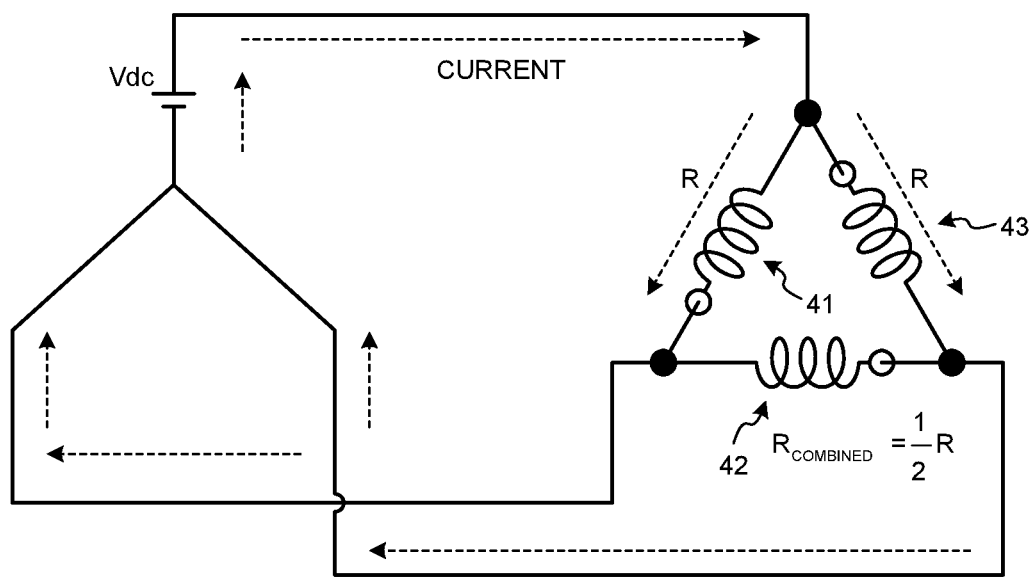
FIG. 18 is a diagram illustrating a current path when a connection state of the connection switching device is Δ connection in the fifth embodiment.

FIG. 18 is a diagram illustrating a current path when the connection state of the connection switching device 2 is the Δ connection in the present embodiment. In FIG. 18, assuming that "R" is the resistance value of each of the stator winding 41, the stator winding 42, and the stator winding 43, a combined resistance is R/2.

As described in the present embodiment, even when a voltage is applied among the three terminals by PWM output, the current value can be estimated from the connection state, so that whether or not the connection state is abnormal can be determined by comparing the estimated current value with a detected current value, and the number of steps for the abnormality determination can be reduced.

As long as the current value can be acquired by passing the current among the three terminals, the on/off patterns of the switching element 11, the switching element 12, the switching element 13, the switching element 14, the switching element 15, and the switching element 16 are not limited to the patterns illustrated in FIG. 16. Although the present embodiment acquires the current value by passing the current through the three terminals, the present invention is not necessarily limited to this example, and the current value may be acquired by passing the current through three or more terminals.

Sixth Embodiment

While the first to fifth embodiments are shown for description of describe the configuration in which electric conduction is made by causing the inverter 1 to perform PWM output, the present invention is not necessarily limited to such configuration. In the present embodiment, description is given for a mode in which electric conduction is made by simply turning on the switching element of the inverter 1 for a certain period of time.

Note that the present embodiment is similar to the first to fifth embodiments except for a manner for electric conduction, and so the descriptions of the first to fifth embodiments are to be cited for the same points as the first to fifth embodiments. That is, the motor drive system 100 of the present embodiment has the configuration illustrated in FIG. 1, and the abnormality determination operation of the controller 3 corresponds to an operation illustrated in the flowchart of FIG. 4.

In the present embodiment, when the current is to be passed from the U phase to the V phase, the controller 3 outputs switching element drive signals such that the switching element 11 and the switching element 14 are both turned on and the switching elements 12, 13, 15, and 16 are all turned off. The current passed in this example is determined by the impedance value and inductance of the stator windings 41, 42, and 43 of the motor 4, and so its current value can be estimated.

According to the present embodiment, control of the controller 3 at the time of the abnormality determination can be simplified as compared with the first to fifth embodiments.

Note that the first to fifth embodiments described above and the present embodiment can prevent the motor 4 from starting in a misconnection state by performing the abnormality determination on the connection state of the connection switching device 2 before the startup of the motor 4, that is, before the current passes through the stator windings 41, 42, and 43. Moreover, the controller 3 may have a configuration such that the motor 4 is locked to prevent the motor 4 from starting with a misconnection when the connection state of the connection switching device 2 is determined to be abnormal. As a result, a misoperation of the motor 4 can be prevented automatically.

Note that the first to fifth embodiments described above and the present embodiment may be adapted to only allow start-up in the Δ connection while not allowing start-up in the Y connection when the connection switching device 2 is determined to be in an abnormal connection state if it is in the Y connection and determined to be in a normal connection state if it is in the Δ connection, or only allow start-up in the Y connection while not allowing start-up in the Δ connection when the connection switching device 2 is determined to be in an abnormal connection state if it is in the Δ connection and determined to be in a normal connection state if it is in the Y connection. In this way, when it is difficult to realize a specific connection state due to a failure of a part of the connection switching device 2, the operation can be continued with a connection state that can be realized. This can delay replacement of the connection switching device 2.

Note that in the first to fifth embodiments described above and the present embodiment, the switching elements 11, 12, 13, 14, 15, and 16 equipped in the inverter 1 are preferably formed from wide band-gap semiconductor materials. By so doing, the motor drive system has low loss, thereby making it possible to increase power efficiency. Here, as the wide band-gap semiconductor materials, silicon carbide (SiC) and gallium nitride (GaN) can be exemplified, which are widely used.

Note that switching of the connection state of the connection switching device 2 in the first to fifth embodiments described above and the present embodiment may be performed collectively for all the U phase, the V phase, and the W phase, or may be performed individually for each of the U phase, the V phase, and the W phase.

Note that in the motor drive system according to the first to fifth embodiments described above and the present embodiment, the three-phase motor is exemplified as the motor 4, the three-phase voltage type inverter is exemplified as the inverter 1, and one with the contact switch mechanical relay is exemplified as the connection switching device 2. However, the present invention is not necessarily limited to this example as long as the configuration and operation described above can be realized.

Note that in the first to fifth embodiments described above and the present embodiment, the determination processing compares the determination value with the value to be determined using determination on whether the value to be determined is larger than or equal to the determination value or is smaller than or equal to the determination value, but the present invention is not limited to this manner, and determination on whether the value to be determined is larger than the determination value or is smaller than the determination value may be used for the comparison.

Note that in the first to fifth embodiments described above and the present embodiment, any connection state other than the Y connection and Δ connection may be added as the connection state of the connection switching device 2. When such a connection state is added, a determination value associated with the added connection state is added. Note that V connection can be exemplified as the connection state other than the Y connection and Δ connection.

Seventh Embodiment

The motor drive system according to the first to sixth embodiments described above can be applied to a motor that operates a compressor or a fan of an air conditioner. The present embodiment describes an air conditioner to which the motor drive system described in the first to sixth embodiments is applied.

Figure 19:
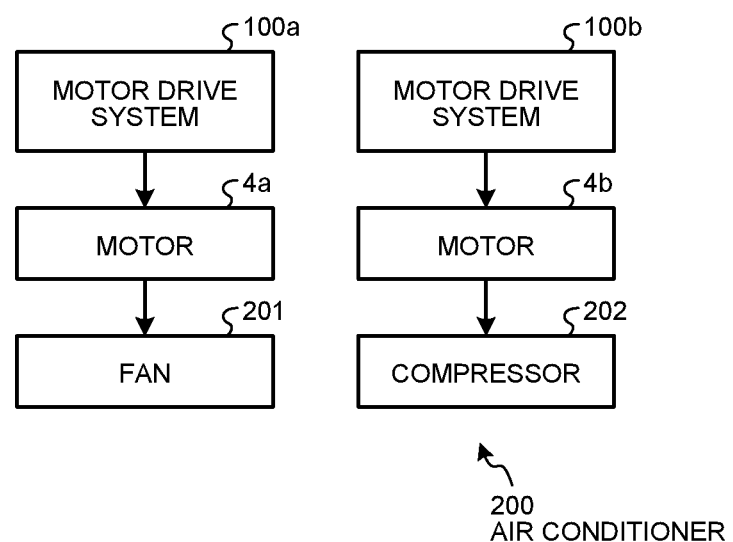
FIG. 19 is a functional block diagram illustrating a configuration of an air conditioner according to a seventh embodiment.

FIG. 19 is a functional block diagram illustrating a configuration of an air conditioner according to the present embodiment. An air conditioner 200 illustrated in FIG. 19 includes motor drive systems 100a and 100b, a motor 4a driven by the motor drive system 100a, a fan 201 operating based on the motor 4a, a motor 4b driven by the motor drive system 100b, and a compressor 202 operating based on the motor 4b. Note that the motor drive systems 100a and 100b are similar to the motor drive system 100 of the first to sixth embodiments, and the motors 4a and 4b are similar to the motor 4 of the first to sixth embodiments.

The fan 201 operates based on the motor 4a to blow air into a space to be air conditioned by the air conditioner 200. The compressor 202 circulates a refrigerant in a refrigerant circuit (not illustrated).

Although FIG. 19 illustrates the air conditioner 200 including the motor drive system 100a and the motor drive system 100b, the present invention is not limited to this example, and the air conditioner 200 may be configured to include only one of the motor drive system 100a and the motor drive system 100b.

Note that in the present embodiment, a control unit (not illustrated) of the air conditioner 200 may double as controllers for the motor drive system 100a and the motor drive system 100b.

In the air conditioner according to the present embodiment, the abnormality determination on the connection state of the connection switching device may be performed not only when the motor 4a or the motor 4b is started, but also when the compressor or the fan is temporarily stopped during operation.

The configuration illustrated in the above embodiments merely illustrates an example of the content of the present invention, and can be combined with other publicly known techniques and partially omitted and/or modified without departing from the scope of the present invention.

The invention claimed is:

1. A motor drive system for driving a motor including a plurality of stator windings, comprising:
    an inverter to convert a DC voltage supplied from a DC voltage source into an AC voltage and apply the AC voltage to the motor;
    a connection switching device disposed between the inverter and the motor and capable of switching a connection state of the stator windings between Y connection and Δ connection; and
    a controller to perform abnormality determination on a connection state of the connection switching device on the basis of a current value of a current flowing in each of the stator windings,
    wherein the controller
    performs control on the inverter to repeat
        a first operation in which the DC voltage is applied between two phases of the inverter during a first time that is predetermined and
        a second operation in which the DC voltage is applied between the two phases during a second time that is predetermined, and
    performs abnormality determination on the connection state of the connection switching device on the basis of the current value obtained by the control.

2. The motor drive system according to claim 1, wherein the controller determines that the connection state is abnormal when any of current values in phases at the time when a voltage is applied between terminals of each of the stator windings of the motor is not within a set allowable range of a current value in each phase.

3. The motor drive system according to claim 2, wherein the allowable range is set for each connection state of the connection switching device.

4. The motor drive system according to claim 3,
wherein the allowable range is determined on the basis of the first time, the second time, a resistance value of the stator windings, and the DC voltage.

5. The motor drive system according to claim 1,
wherein the controller determines that the connection state is abnormal when current values of currents in phases flowing by application of a voltage between terminals of each of the stator windings of the motor are not within a set range of equality.

6. The motor drive system according to claim 1,
wherein the controller determines that the connection state is abnormal
when any one of current values of currents in phases flowing by application of a voltage between terminals of each of the stator windings of the motor is not within a set allowable range of a current value in each phase, or
when the current values of currents in the phases flowing by application of a voltage between the terminals of each of the stator windings of the motor are not within a set range of equality.

7. The motor drive system according to claim 1,
wherein the controller determines that the connection state is abnormal
when current values of currents in phases flowing by application of a voltage between terminals of each of the stator windings of the motor are not within a set range of equality, or
when a comparison between a sum of the current values in the phases before switching connection of the connection switching device and a sum of the current values in the phases after switching connection gives a result not reflecting the switching.

8. The motor drive system according to claim 1,
wherein, when the voltage is applied between terminals of the stator windings of the motor, voltage is applied to three or more terminals.

9. The motor drive system according to claim 1,
wherein a switching element of the inverter is formed of a wide band-gap semiconductor.

10. The motor drive system according to claim 9,
wherein material of the wide band-gap semiconductor is silicon carbide or gallium nitride.

11. An air conditioner, wherein the motor drive system according to claim 1 causes the motor to drive a compressor or a fan.

* * * * *